June 16, 1953 M. SASSO 2,641,829
METHOD OF CONNECTING BEAMS TO GIRDERS
Filed Oct. 2, 1945 5 Sheets-Sheet 1
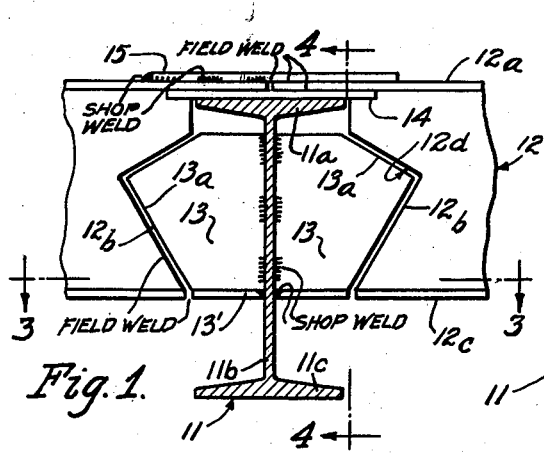
Fig. 1.
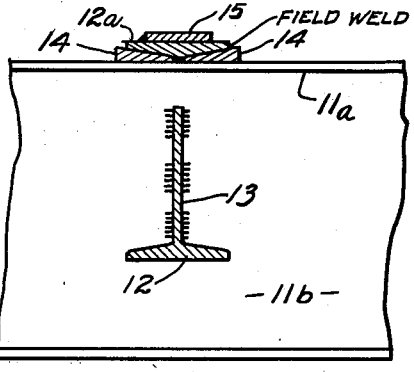
Fig. 4.
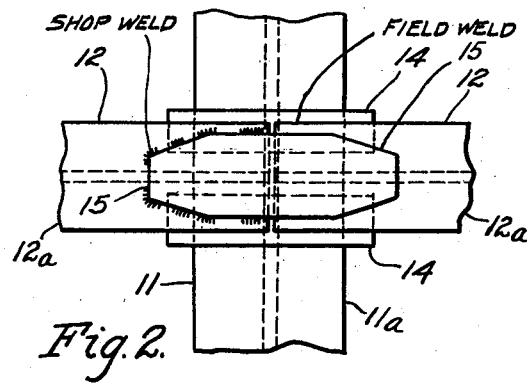
Fig. 2.
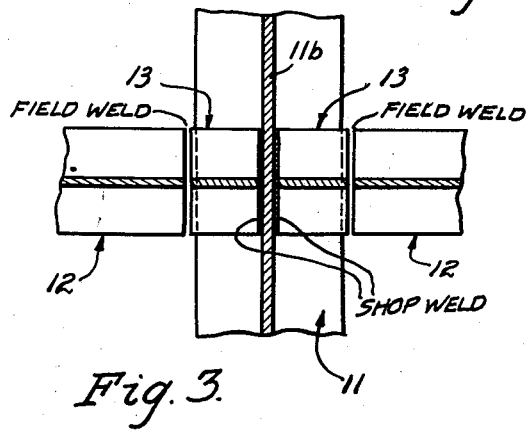
Fig. 3.
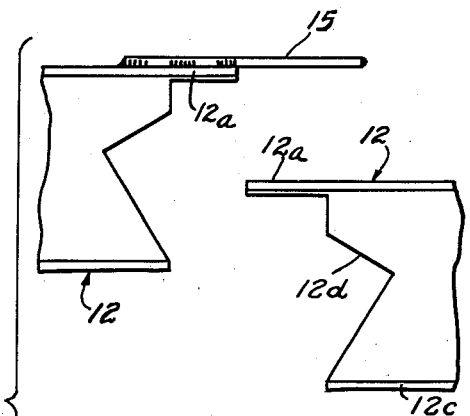
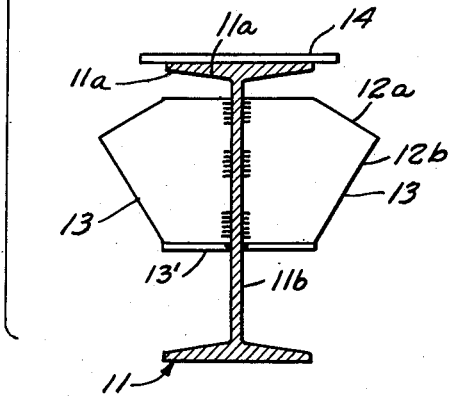
Fig. 5.
INVENTOR:
MAURICE SASSO
BY Robt. W. Pearson
ATTORNEY.

June 16, 1953 M. SASSO 2,641,829
METHOD OF CONNECTING BEAMS TO GIRDERS
Filed Oct. 2, 1945 5 Sheets-Sheet 3
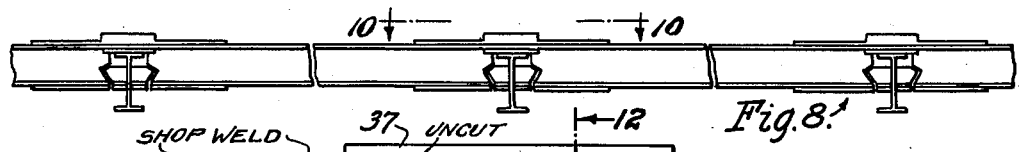
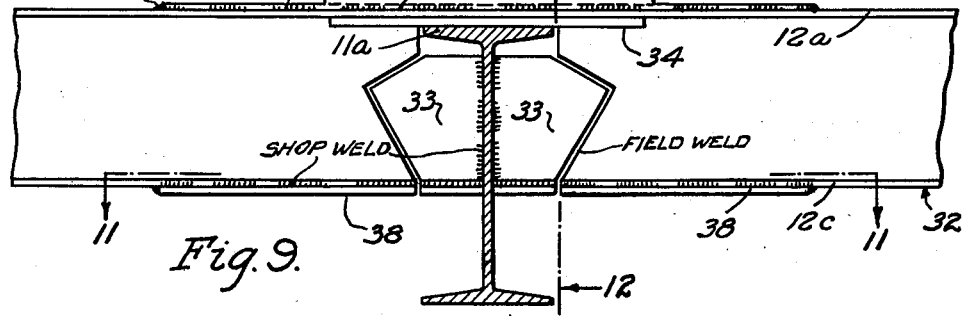
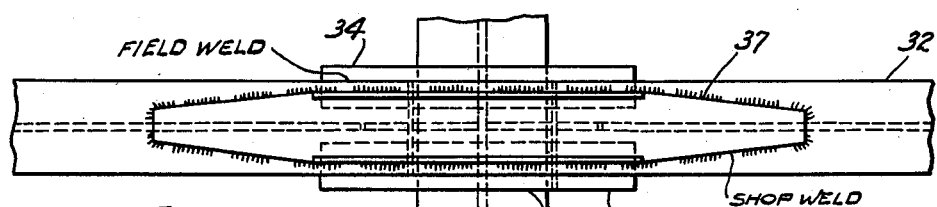
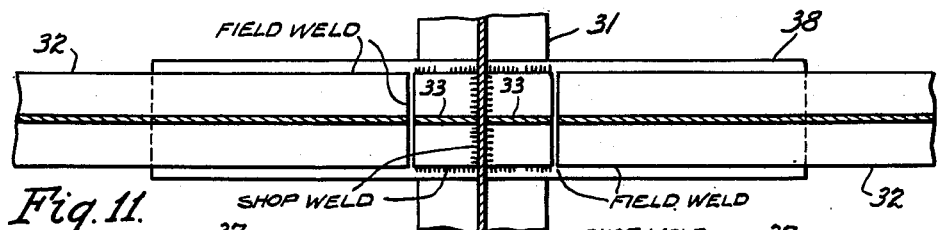
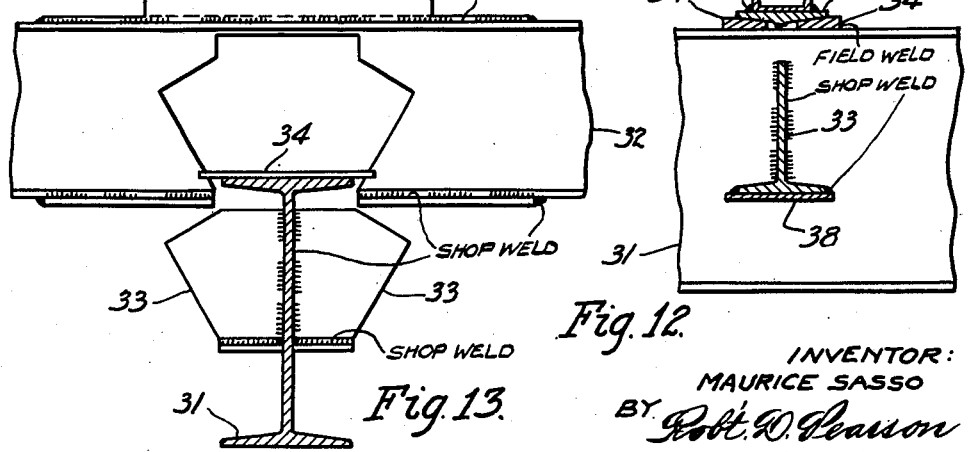
INVENTOR:
MAURICE SASSO
BY Robt. D. Pearson
ATTORNEY June 16, 1953 M. SASSO 2,641,829
METHOD OF CONNECTING BEAMS TO GIRDERS
Filed Oct. 2, 1945 5 Sheets-Sheet 4

INVENTOR:
MAURICE SASSO
BY Robt. W. Pearson
ATTORNEY

June 16, 1953  M. SASSO  2,641,829
METHOD OF CONNECTING BEAMS TO GIRDERS
Filed Oct. 2, 1945  5 Sheets-Sheet 5
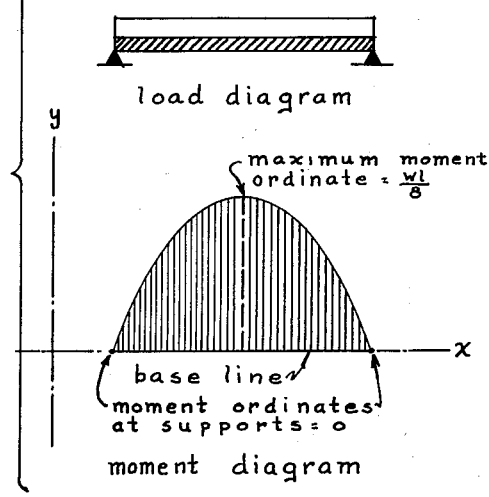
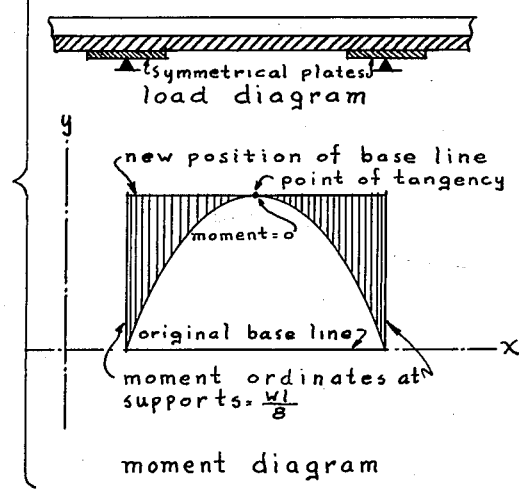
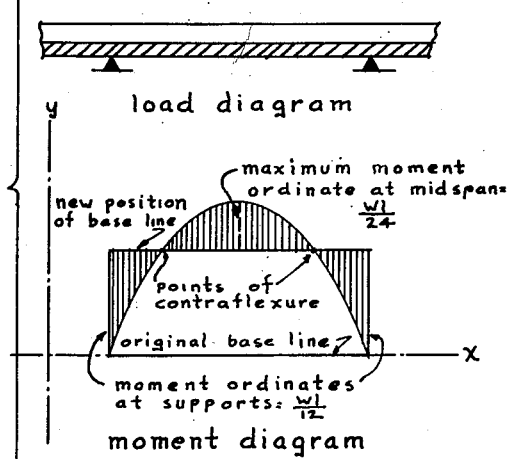
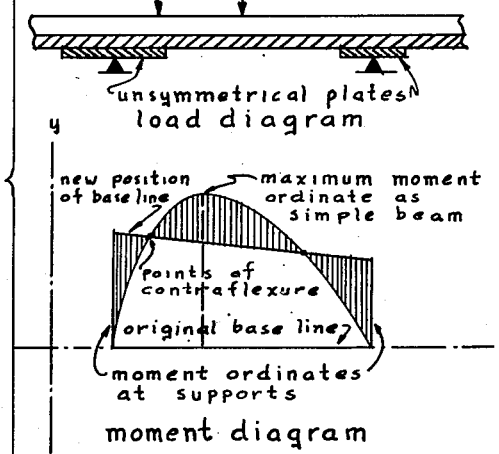
INVENTOR.
MAURICE SASSO Patented June 16, 1953

2,641,829

UNITED STATES PATENT OFFICE 2,641,829

METHOD OF CONNECTING BEAMS TO GIRDERS

Maurice Sasso, Los Angeles, Calif.

Application October 2, 1945, Serial No. 619,787

6 Claims. (Cl. 29—155)

This invention relates to building elements and to a system of constructing same.

More specifically speaking the invention relates to a beam to girder construction wherein a beam is angularly connected to a girder or to a like part, and to the method whereby such a structural arrangement is erected.

This invention is somewhat related to the building structure disclosed in Patent 2,326,688, on structural elements, issued to me August 10, 1943.

Generally speaking, among the objects of the invention are: to provide for a readily erected and efficient beam to girder joint which will develop continuity of the beam over the girder, restrain the beam at the girder, and adequately resist combined moments due to static and dynamic force without increasing the size of the beam throughout its length.

For certain conditions of loading occurring in the majority of building frame members of constant moment of inertia, the maximum bending moment due to superimposed load or loads on beams simply supported, prevail only over a relatively small fraction of the span length.

For this reason beams simply supported and of constant moment of inertia designed to resist the maximum bending moment due to superimposed loads at any point along their span are actually over designed for the larger part of their length and therefore wasteful of materials.

Large savings in materials and total cost of structure can be realized when a beam of constant moment of inertia is attached to its supports by special methods, which will change the condition of a simply supported beam to an end restrained beam. These savings can be further increased if in addition to special attachments for its supports the beam is made of variable moment of inertia.

The moment due to external loading in a beam with constant moment of inertia and rigidly attached to unyielding supports, so that the beam is structurally fixed at its supports, is by reason of mechanics apportioned to a maximum resisting moment at a section along its span and a maximum resisting moment at its supports, and these apportioned moments are complements of one another. In applied mechanics it is proven that the magnitude of these complementary resisting moments and the proportion of one to the other varies directly with the moment of inertia of the beam at the various sections along its span.

If the moment of inertia of a beam made continuous or fixed at its ends is larger at its supports than at its mid-span a larger proportion of the moment due to the external loading will be resisted at the support than it would if the beam were of constant moment of inertia; the larger the resisting moment at the fixed supports is made the smaller its complement or resisting moment between supports will be, consequently a smaller beam will be required for the major part of the span length.

One of the objects of this invention is to proportion and construct beams to resist only a fraction of the bending moment due to superimposed loads between the supports, and to provide means to develop the degree of end restraint and the cross section required to resist the balance of the bending moment at the supports: also adequately to resist the combined moments due to static and dynamic forces without increasing the size of the beam throughout its length.

The same mechanical laws stated above apply to end restrained beams which result when opposing beams are made structurally continuous across their support.

In this invention the moment of inertia of a beam is made variable by selecting a beam of uniform cross section, attaching a bar or bars at one or at both flanges, where required, and integrating the various pieces so that the resulting section, as a whole, will be capable of resisting the stresses caused by the superimposed loads.

The proper selection of the beam for a given span and loading is of course subject to the requirements of shear, buckling, deflection, lateral stiffness and any other condition which the design must satisfy.

By varying the cross sectional area and the length of the bars to be attached on the flanges of the beam at its supports, the magnitude of the resisting moment at the supports may be made to suit any required condition.

Outstanding among the functions of the flexibility of the above described method of design and construction is the fact that it will permit the structural designer to provide the necessary resistance in beams subject to dynamic forces such as wind and earthquake, in the most effective manner and with the utmost economy. The effect of these forces is to induce stresses which are maximum at the support and taper to zero at mid-span.

This method is most effective because it builds up resistance where and as required, and is most economical because it eliminates the necessity of increasing the cross section of the beam throughout its length.

The present knowledge of welding theory and practice, the available equipment developed by the industry and the supply of skilled welders to produce good welding makes the construction of beams with variable moment of inertia easy and economical. However, good results can also be attained by riveting provided the necessary modifications in details are made, but riveting is more costly than welding.

Having discussed the behavior of beams with constant moment of inertia and restrained ends and that of beams with variable moment of inertia and restrained ends, I will now describe and illustrate the method of application in actual construction.

It is among the objects of the present invention not only to save materials and lower erection costs and to expedite erection of the structure while employing fewer workmen and tools, but to attain other objects, advantages and features of invention which will hereinafter appear.

Another object of the invention is to provide a beam to girder connection which is failure proof especially in a multi-span beam in which the top flange of the beam is made continuous across its supports (uncut) whether or not it is reinforced with a bar or bars cut to fit thereinto.

Referring to the accompanying drawings, which illustrate what is at present deemed to be a preferred embodiment of the invention, Fig. 1 is a detail of a beam to girder connection in which the upper flanges of the beams overlie the upper flange of the supporting girder and the top flanges of the beams join at about the center line of the girder's upper flange;

Fig. 2 is a top plan view of Fig. 1;

Fig. 3 is a sectional view taken on line 3—3 of Fig. 1;

Fig. 4 is a sectional view taken on line 4—4 of Fig. 1;

Fig. 5 is a girder group, with beams in position to be lowered onto the girder and shifted into place for welding;

Fig. 8 is an elevational view of a multiple span beam with continuous upper flange, web and lower flange being coped out to permit lowering of the beam onto the girder, one or both flanges of the beam being reinforced to increase its resistance at supports.

Fig. 9 is a detail of beam to girder connection of a multiple span beam with reinforcing bars at the top and bottom flanged at the support.

Fig. 10 is a top view of Fig. 9;

Fig. 11 is a sectional view taken on line 11—11 of Fig. 9;

Fig. 12 is a sectional view taken on line 12—12 of Fig. 9;

Fig. 13 is an elevational view of an erected girder, the multiple span beam being positioned to be lowered onto the girder and shifted into place for welding;

Figure 19 is the graph of the bending moment for a beam simply supported and subject to a uniform load; it is observed that the maximum moment ordinate occurs between the supports, and that the moment ordinate at the ends of the beam is zero. The design moment for this type of beam is $M = WL/8$.

Figure 7:
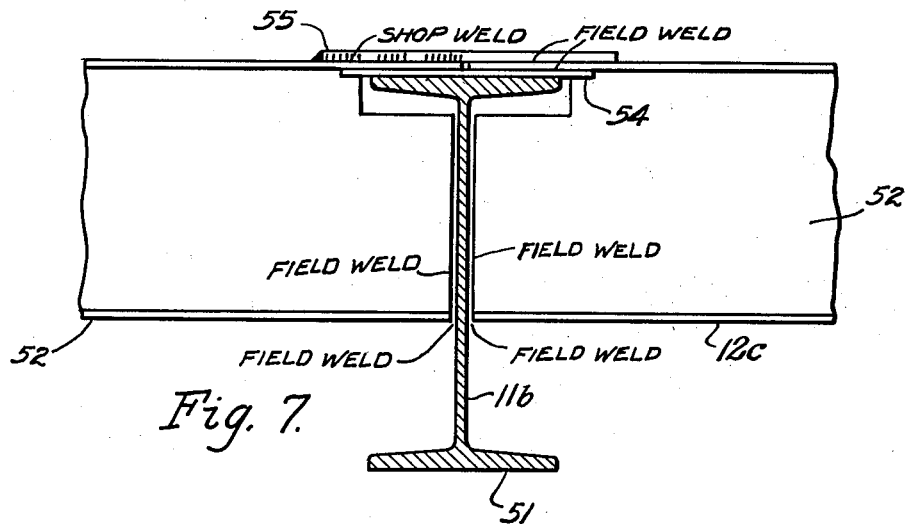
Fig. 7 is a detail of beam to girder connection in which part of the web below the upper flange is coped, the web and lower flange being welded to the web of the girder. The upper flange of the beam overlies the upper flange of the girder.

Figure 20 is the graph of the bending moment of a beam of same span and supporting the same uniform load as in Figure 19, except that its ends are fully continuous or 100% fixed. Under this condition the moment between the support has decreased from $WL/8$ to $WL/24$ and the moment at the support has increased from zero to $WL/12$. The design moment for this type of beam is $M = WL/12$ e. g. if full continuity or fixity is attained at the beam ends, the design moment is reduced 33.3%. It is observed that the moment curve crosses the base line at two point denoted point of contraflexure; the position of these points are in a definite mathematical relationship with the degree of continuity, or fixity of the beam ends.

Figure 21 is the graph of the bending moment of a beam similar to that of Figure 20, except that plates have been added at the ends to increase the rigidity of the beam at the supports; the effect of these plates is to move the base line further up from the position shown in Figure 20, thus decreasing the moment ordinate at midspan and increasing the moment ordinate at the supports. The selection of proper plates will raise the base line to the point where the moment ordinate at midspan becomes zero and the moment ordinate at the supports becomes $WL/8$.

Figure 22 is the graph of a beam subject to various unsymmetrical loads and with ends of unequal rigidity. This condition illustrates the resulting unequal moments at the supports, the unsymmetrical points of contraflexure and the slope of base line due to unequal rigidity of the ends.

In general by making the ends of a beam continuous or fixed the design moment is reduced, consequently a beam of small cross section than that of a beam simply supported is required. By increasing the rigidity at the ends of a continuous or fixed ended beam, additional economies are realized, and by varying the end rigidity the distribution of the moment may be made to satisfy any design condition with less material than that required if a simply supported beam is used.

Figs. 1 to 5 inclusive show the top flanges of beams overlaying and supported on the top flange of a girder; they show also the beams' top flanges made continuous by a butt weld, while the bottom flanges are made continuous by a butt weld on the girder web.

Referring in detail to the drawings, in Figs. 1 to 5 is shown a beam 12 with its top flange 12a overlaying and supported on the top flange 11a of a girder 11, the beams' top flanges 12a being made continuous by means of butt welds.

The reaction of the beam 12 on the girder 11 is transferred by means of brackets 13. Figs. 1 and 2 show the top flanges of each beam extending from center line to center line of the supporting girder. Each bracket 13 is a coped section from each end of the beams 12, cut on a bias and juxtaposed to the girder 11 and welded thereto before erection. Each bracket connects the web of each beam and its bottom flange 12c in their final erected position. Each bracket 13 has its bottom flange 13' made continuous by butt welds on the girder web 11b, also the webs of the bracket and of the beam are welded to each other to make the beam continuous. The shape of the coping is designed for best resistance and transfer of the shearing stresses.

The features of overlaying the upper flanges 12a of the beams 12 on the flanges 11a of the girder enables erection of the beams without the necessity of using erection clips, and also makes it possible for butt welding of the top flanges of alined beams to develop continuity. However, the allowable tension in butt welding permitted by most building codes is 16,000 pounds per square inch while the tension in the beam flange is 20,000 pounds per square inch. Thus, as butt welding develops only 80 per cent of the beam flange tension, it is necessary that the remaining 20 per cent tension required be developed by adding bars or plates whose cross sectional area is at least 20 per cent of the beam flange area.

The allowable unit stress in compression in butt welded construction is usually the same as that for the base metal, and no additional bars or plates are required at the bottom flange except in cases where a possible reversal of stresses produces tension greater than 16,000 pounds per square inch.

Each bar 14, Figs. 1, 2, 4, and 5, forms a filler plate of wedge-shaped cross section, with opposite surfaces of said wedge of the same angularity as that of the beam flanges. Said bars 14 are inserted between the top flange 12a of beam 12 and the top flange 11a of girder 11. When the wedges 14 are driven into their final position they maintain the superjacent relation of the flanges of the beams to the flanges of the girder. Said filler bars or wedges 14 are made of such cross section as to perform the following functions; they will:

(a) Supplement the 20 per cent tension deficiency of the butt-weld of beam flanges mentioned above;

(b) Permit even bearing of beam flanges over girder flanges;

(c) Eliminate the necessity of grinding the coped web of the beam (cutting of beam web being all that is necessary);

(d) Furnish the backing for butt-welding of beam flanges;

(e) Increase the bending and shearing resistance of flanges; and (f) Permit alignment of the web and the bottom flange of the beam with the web and the bottom flange of bracket 13.

The bar 15, Figs. 1, 2, 4 and 5, is a splicing bar or plate welded on top of the beam's flange and is used only when butt-welding of the beam's flange to the web 11b of the girder is omitted, or when additional tension resistance is needed. If used for the latter purpose, then a similar plate welded on the bottom flanges (not shown in this type of joint) may be required.

The metal needed to provide the joint construction shown in Figs. 1 to 5 is represented by said bars or plates 14 whose weight does not exceed one-third that of the angle clips used in standard riveted joints.

The bracket 13 (Fig. 1) consists of a polygonal (shown as pentagonal) section coped from the web and lower flange 12c of the beam 12 in such a manner that one edge portion 13a of said polygonal bracket provides a shoulder support for the overlying web portion 12d of the beam when the latter is brought into proper juxtaposition therewith. Thus, after the final assembling and welding of the shouldered joint the subjacent edge portions of the polygonal bracket 12b and web of the beam 12 and the abutting lower flanges 13' of the bracket, with the beam provide a continuous interfitting connection.

In the process of erection the beam is laid on its supports and while held by its flanges, it may, by some cause, be displaced, laterally. To prevent such displacement temporary clamps should be used to hold the members in their position until made permanently fast. This type of joint can be used for beams of single length and of multi-span length as well.

Figure 6:
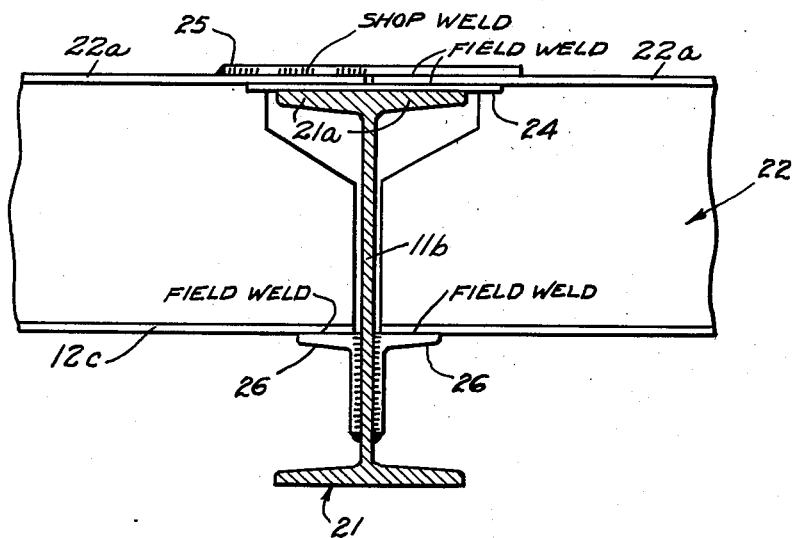
Fig. 6 is a detail of a beam to girder connection, the beam flange overlying the girder flange, the web of the beam below the upper flange being cut on a bias for ease of erection, the beam resting on a shelf bar attached to the girder.
Figure 14:
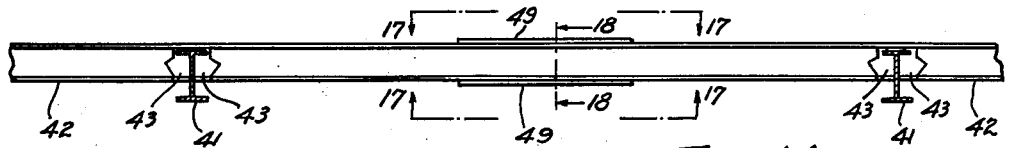
Fig. 14 is an elevational view of a multiple span beam with varying moment of inertia and a continuous upper flange, the web and lower flange being coped out to permit lowering onto the girder, the upper and lower flange of the beam being reinforced in the midspan section to increase its bending moment resistance.
Figures 15, 18:
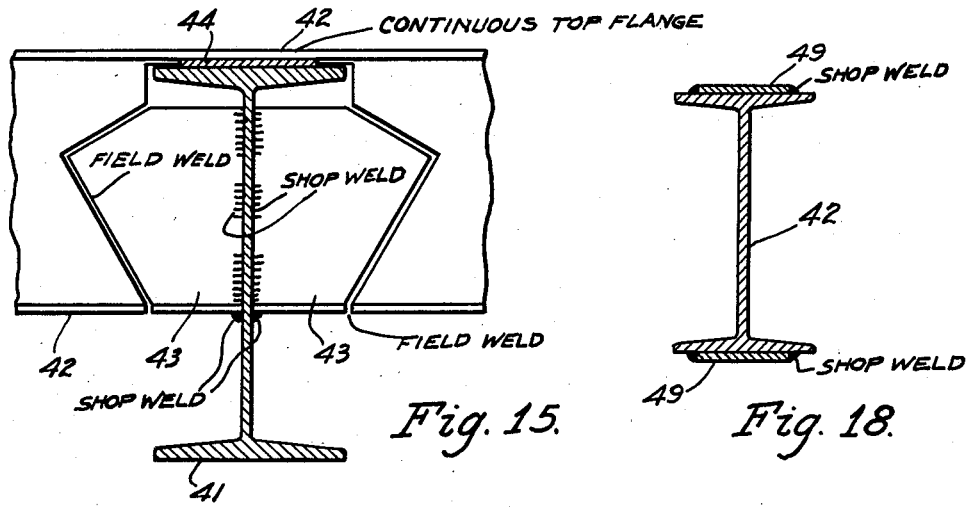
Fig. 15 is a detail of a beam to girder connection of the multiple span beam shown in Fig. 14.
Fig. 18 is a sectional view taken on line 18—18 of Fig. 14.
Figure 17:
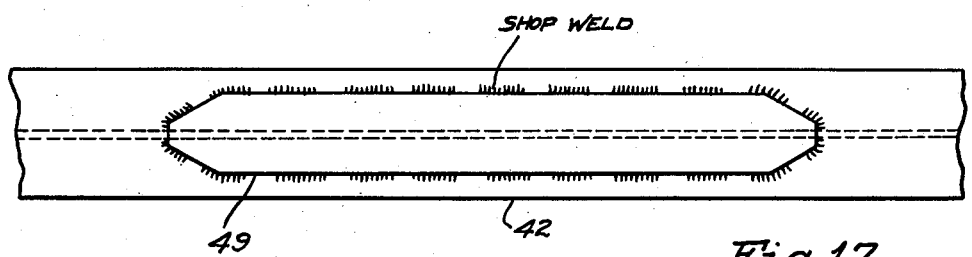
Fig. 17 is a top view of Fig. 14 showing a reinforcing flange bar.
Figure 16:
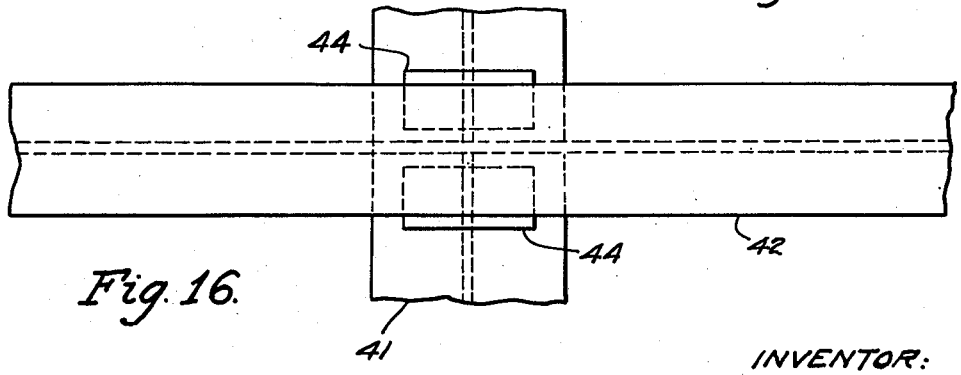
Fig. 16 is a top view of Fig. 15.

Referring to the modification shown in Fig. 6, the top flanges 22a of the beams 22 are in the same relative position in relation to the top of the girder 21 flanges 21a and are joined in the manner already described in Figs. 1 to 5. Hence, all details of connection of the upper flanges in the latter joint apply to said modification. In this modified joint I provide brackets 26, 26 welded to opposite sides of girder web 11b which (Fig. 6), replace the bracket 13 of the joint of Figs. 1 to 5. Bars 24 and 25 perform the same function as bars 14 and 15 described in joint of Fig. 1. The brackets 26, 26 are in the form of a shelf such as an angle, a T, or split I section. The length and width of the shelf 26 is governed by the type of welding used in developing the total compression of the beam flange. If the compression is developed by butt-welding the beam's lower flange 12c to the girder web 11b, the shelf length need not exceed the width of said flange, and shelf width is governed by the end bearing of the beam. If the compression is developed by fillet-welds along the edges of the flange, then the length of the bracket shall exceed the width of the beam's flange by one inch, and its width be such as to permit the necessary length of fillets. This type of joint requires less coping, less welding, is simpler to execute and more economical than the joint first described but the joints shown in Figs. 1 to 5 are of a higher structural value and performance.

Referring to the second modification, shown in Fig. 7, the continuity of the tension flange is attained in the same manner as in the joint first described and all that is said in connection with the latter applies to this joint. The compression is developed by butt-welding the bottom flanges 12c of beams 52 to girder web 11b of the girder 51, and the end shear is carried into the girder by welding the beam web into the girder web. The bars 54 and 55 function in the same manner as bars 14 and 15 of Fig. 1 and 24 and 25 of Fig. 6. This type of joint is neat in appearance and preferred when the structural members are exposed, however it requires more accurate cutting and more field welding than in the first modified form shown in Fig. 6.

Referring to the modified joint shown in Figs. 8, 9, 10, 11, 12, and 13, the beam 32 is of multi-span length and is reinforced by supports 33. In this joint the top flange 12a of the beam is continuous (uncut) across the support, and overlays the top flange 11a of the girder, while the bottom flange 12c and web are coped-out to permit lowering of the beam onto the girder. The top flange of the beam is spaced from the flange of the girder by bar 34 which performs all purposes of the plate 14 mentioned in the first joint described (Figs. 1 to 5), and in addition forms part of the supporting shoulder. The bar 37 is added to the top flange of beam 32 to complete the support afforded by that flange. The bar 38 is added to the bottom flange 12c of said beam 32 and constitutes a reinforcement for the lower flange.

The main purpose of building up tension and compression resistance of the beam 32 at its supports is to reduce its cross section through its span and thus save metal.

In this type of joint the continuous top flange of the beam is interposed between bars 34 and 37. This feature reduces the eccentricity in the welds and results in a better distribution of stresses.

The advantages of a continuous, uninterrupted top flange are (1) it reduces the cross sectional area of the reinforcing bars; (2) it eliminates their splicing; (3) it is structurally safer than any splice; (4) it eliminates provision during erection, of devices such as erection clips, clamps, etc. This type of joint is structurally highly efficient and economical as well.

Referring to the modified joint shown in Figs. 14 to 18, this joint is used for multi-span beams with variable moment of inertia, and continuous top flanges. The bar or plate 44 is a filler used to space the cut web of beam from girder flange. The bar or plate 49 is used to increase the tension and compression resistance of a beam between supports in end spans or at intermediate spans where excessive moment requires it. The bar or bracket 43 performs the same function as in the type of joint first described.

Considering the invention as a method, the steps thereof consist in coping out a section 13 from the end portion of a beam leaving the upper flange of said beam uncut at a joint, thus providing a bracket, then welding said bracket to the web of a girder in a position to form a support for the end portion of the beam from which it is coped, then juxtaposing said beam to said bracket by inserting bar 14 between the top girder flange 11a and the top beam flange 12a in such a manner as to be supported by the bracket, welding said bracket back into place in relation to the beam from which it was coped, rigidly attaching the bar 15 onto the top flange of the beam in a position to bridge the space superjacent to said coped out part, and finally in some cases adding a lower bar to increase the beam's compression resistance. In the illustrated embodiments of the invention the bracket is shown pentagonal in shape, but in its broader aspect the claimed invention is not limited to a bracket of the specific number of sides shown in the drawings. The cutting out of said polygonal bracket and subsequent putting it back into place by field welding is necessary as it would otherwise be difficult or impossible to bring the beam into its mounted position and develop 100% continuity.

Figs. 6 and 7 show additional methods of obtaining continuity.

I claim:

1. The method of angularly connecting a beam to a girder preferably by welding or otherwise, which consists in coping out an end portion of the web and flange of a beam, thus providing a bracket; then rigidly attaching said bracket to the web of a girder in a position to form a support for the end portion of the beam from which it is coped, then juxtaposing said beam to said bracket in such a manner as to be supported by the latter; and finally rigidly attaching the bracket to said beam in its original relation thereto.

2. The method of mounting a beam in a supported position between two spaced apart girders which consists in angularly coping from the ends of said beam brackets to support said beam, attaching said brackets to the facing webs of said girders, then juxtaposing the beam to said brackets to cause the opposed cut-out edges of the beam to interfit with said brackets in their original position before coping out, and then joining together edge portions of the bracket and beam.

3. The subject matter of claim 1, and said coping operation being performed in such a manner as to provide the brackets with sloping shoulders to support the ends of the beam.

4. The method of constructing a beam to girder connection for a multi-span beam made continuous at supports, which consists in coping a section from the lower edge and web of the beam, with the upper flange uncut, at a joint in its multi-span arrangement, splitting said coped section along a line transverse to the lower edge into identical sections, then welding said identical sections in an edgewise manner to a girder to which said multi-span beam is to be connected, thus rigidly uniting the web and flange portions of said identical sections to the web of the intervening girder, then superimposing said cut-out portion of said beam into registry with said identical sections with the upper flange of said beam bridging the girder to which said cut-out sections are applied, and finally joining the edges of the coped sections to the beam.

5. The subject matter of claim 3, and inserting wedges between opposite side portions of the lower face of the upper beam flange at each side of its web and the upper face of the flange of the girder, and then joining said wedges in their finally applied positions.

6. The method of supporting a beam of flanged cross section on and between spaced girders of flanged cross section which consists in cutting the web of the beam at its end inwardly of the end of its upper flange, moving the beam into a position whereat its upper flange overlies the upper flange of said girder, mounting plates over the upper flange of said girder and adjacent the upper flange of said beam, and welding the flange of said beam and said girder and said plate together to provide a rigid joint, coping the web of said beam at its ends, welding the webs of brackets to the webs of the beam and girder, the webs of the brackets being coped to correspond to the web of the beam, to additionally support said beam on the web of the brackets.

MAURICE SASSO.

References Cited in the file of this patent

UNITED STATES PATENTS

| Number | Name | Date |
|---|---|---|
| 794,246 | O'Shea | July 11, 1905 |
| 1,883,376 | Hilpert et al. | Oct. 18, 1932 |
| 2,014,430 | Fish | Sept. 17, 1935 |
| 2,042,797 | Nechin | June 2, 1936 |
| 2,043,207 | Bayley et al. | June 2, 1936 |
| 2,201,047 | Moore et al. | May 14, 1940 |
| 2,326,688 | Sasso | Aug. 10, 1943 |
| 2,371,964 | Lee | Mar. 20, 1945 |

OTHER REFERENCES

Arc Welding in Design, Manufacture and Construction, Pub. by the James F. Lincoln Arc Welding Foundation, 1939, page 569.